United States Patent
Asai et al.

(10) Patent No.: US 6,794,465 B2
(45) Date of Patent: Sep. 21, 2004

(54) METHOD OF PREPARING AN ACRYLIC COPOLYMER

(75) Inventors: Tomohito Asai, Suita (JP); Masatoshi Oohata, Sakai (JP); Koji Nakajima, Ikoma (JP)

(73) Assignee: Nippon Paint Compnay, Ltd., Osaka (JP)

( * ) Notice: Subject to any disclaimer, the term of this patent is extended or adjusted under 35 U.S.C. 154(b) by 0 days.

(21) Appl. No.: 10/462,783

(22) Filed: Jun. 17, 2003

(65) Prior Publication Data

US 2003/0236373 A1 Dec. 25, 2003

(30) Foreign Application Priority Data

Jun. 20, 2002 (JP) ........................................ 2002-179255

(51) Int. Cl.[7] .................................................. C08F 2/00
(52) U.S. Cl. ........................... 526/73; 526/79; 526/203; 526/319; 526/318.2; 526/346; 526/347.1
(58) Field of Search ............................ 526/73, 79, 319, 526/203, 318.2, 346, 347.1

(56) References Cited

U.S. PATENT DOCUMENTS

| | | | | |
|---|---|---|---|---|
| 4,042,768 A | * | 8/1977 | Muller et al. ................. 526/65 |
| 4,130,700 A | * | 12/1978 | Kamath ......................... 526/73 |
| 5,886,122 A | * | 3/1999 | Oka et al. .................... 526/328 |
| 5,948,396 A | * | 9/1999 | Das et al. ................. 424/70.17 |
| 6,462,138 B1 | * | 10/2002 | Rupaner et al. ......... 525/329.1 |
| 6,593,399 B1 | * | 7/2003 | La Fleur et al. ............. 523/201 |
| 6,608,150 B1 | * | 8/2003 | Wicher ......................... 526/73 |

* cited by examiner

Primary Examiner—Tatyana Zalukaeva
(74) Attorney, Agent, or Firm—Townsend & Banta

(57) ABSTRACT

The present invention is a method of preparing an acrylic copolymer using as a raw material a monomer mixture comprising 50 mole % or more of a monomer having a polymerizable double bond formed by a carbon atom to which no hydrogen atom is bonded and a carbon atom to which a hydrogen atom is bonded, wherein after the polymerization is carried out at a polymerization temperature of 150° C. or higher, further heating at 80–130° C. is done.

The present invention can provide a method of preparing an acrylic copolymer with a low amount of unreacted monomers using high temperature polymerization at 150° C. or higher.

40 Claims, No Drawings

METHOD OF PREPARING AN ACRYLIC COPOLYMER

RELATED APPLICATION

This application claim the priority of Japanese Patent application No. 2002-179255 filed on Jun. 20, 2002, which is incorporated herein by reference.

BACKGROUND OF THE INVENTION

1. Field of the Invention

The present invention relates to a method of preparing an acrylic copolymer, and particularly to a method of preparing an acrylic copolymer at a high temperature of 150° C. or higher.

2. The Prior Art

In order to reduce environmental burdens, so-called high solid type coatings, which contain a lesser amount of organic solvents, are drawing attention. For the binder ingredient of a high solid type coating, an acrylic polymer with a high solid content ratio having a molecular weight of several thousands is commonly used because of its application workability. In order to obtain such an acrylic polymer, it was necessary to raise the polymerization temperature to 130–140° C., which is higher than usual, to increase the amount of the initiator, and/or to jointly use a chain transfer agent. However, a polymer usually obtained under such conditions has a lower solid content ratio and an additional process of removing the organic solvent by means of distillation is required to achieve the target solid content ratio. Also, the increase in the amount of initiator and/or chain transfer agent is not preferable considering the cost.

An example of solutions to this problem is a method in which the aforementioned polymerization is carried out at a high temperature, i.e. 150° C. or higher. By using this method, a polymer having a relatively low molecular weight can be obtained with a high solid content ratio. However, methacrylate monomers at high temperatures go through polymerization and depolymerization simultaneously. Because of this, when the ratio of the methacrylate monomer ingredient is high in the acrylic polymer, there is a problem in that unreacted monomers remain in the system.

The object of the present invention is to provide a method of preparing an acrylic copolymer with a low amount of unreacted monomers using high temperature polymerization at 150° C. or higher.

BRIEF SUMMARY OF THE INVENTION

The method of preparing an acrylic copolymer of the present invention is a method of preparing an acrylic copolymer using as a raw material a monomer mixture comprising 50 mole % or more of a monomer having a polymerizable double bond formed by a carbon atom to which no hydrogen atom is bonded and a carbon atom to which a hydrogen atom is bonded wherein, after the polymerization is carried out at a polymerization temperature of 150° C. or higher, further heating at 80–130° C. is done. The aforementioned monomer having a polymerizable double bond formed by a carbon atom to which no hydrogen atom is bonded and a carbon atom to which a hydrogen atom is bonded can be a methacrylate monomer, α-methylstyrene, itaconic acid, itaconic acid anhydride, citraconic acid, or citraconic acid anhydride.

Also, a second monomer mixture consisting of a monomer having a polymerizable double bond formed by a carbon atom to which no hydrogen atom is bonded and a carbon atom to which a hydrogen atom is bonded and/or an initiator can be added at the time of heating after the aforementioned polymerization reaction. The aforementioned monomer having a polymerizable double bond formed by a carbon atom to which no hydrogen atom is bonded and a carbon atom to which a hydrogen atom is bonded can be a polymerizable aromatic compound and/or acrylate monomer. Also, the aforementioned monomer having a polymerizable double bond formed by two carbon atoms to which a hydrogen atom is bonded can be part of the monomers that are constituents of the aforementioned monomer mixture.

DETAILED DESCRIPTION OF THE INVENTION

In the method for preparing an acrylic copolymer of the present invention, first the polymerization reaction is carried out at a polymerization temperature of 150° C. or higher, using as a raw material a monomer mixture comprising 50 mole % or more of a monomer having a polymerizable double bond formed by a carbon atom to which no hydrogen atom is bonded and a carbon atom to which a hydrogen atom is bonded.

The aforementioned polymerizable double bond formed by a carbon atom to which no hydrogen atom is bonded and a carbon atom to which a hydrogen atom is bonded is a structure represented by a methacrylate group. A description using ethylene as an example follows. In this example structure, both hydrogen atoms bonded to one carbon atom that is a constituent of ethylene are replaced by carbon atoms, and two hydrogen atoms bonded to the other carbon atom stay unchanged or only one hydrogen atom is replaced by a carbon atom. A double bond having such a structure is known to go through polymerization and depolymerization simultaneously at high temperatures.

Examples of the aforementioned monomer having a polymerizable double bond formed by a carbon atom to which no hydrogen atom is bonded and a carbon atom to which a hydrogen atom is bonded include methacrylate monomers. Specific examples of the methacrylate monomer include methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, lauryl methacrylate, phenyl methacrylate, isobornyl methacrylate, cyclohexyl methacrylate, t-butylcyclohexyl methacrylate, dicyclopentadienyl methacrylate, dihydrodicyclopentadienyl methacrylate, methacrylic acid, hydroxyethyl methacrylate, hydroxypropyl methacrylate, hydroxybutyl methacrylate, glycidyl methacrylate, methacryl alcohol, adduct of hydroxyethyl methacrylate and ε-caprolactone, methacrylamide, N-methylol methacrylamide, N-butoxymethyl methacrylamide, N,N-dimethyl methacrylamide, N,N-dibutyl methacrylamide, N,N-dioctyl methacrylamide, N-monobutyl methacrylamide, N-monooctyl methacrylamide, N-(2-hydroxyethyl) methacrylamide, methacrylonitrile, and ω-carboxy polycaprolactone monomethacrylate.

Examples other than a methacrylate monomer include α-methylstyrene, itaconic acid, itaconic acid anhydride, citraconic acid, and citraconic acid anhydride. The aforementioned monomer having a polymerizable double bond formed by a carbon atom to which no hydrogen atom is bonded and a carbon atom to which a hydrogen atom is bonded can be of more than one type.

In the aforementioned mixture, the content of the monomer having a polymerizable double bond formed by a carbon atom to which no hydrogen atom is bonded and a carbon atom to which a hydrogen atom is bonded is 50 mole % or more. If it is less than 50 mole %, then the amount of unreacted monomers in the high temperature polymerization is not very problematic.

The aforementioned monomer mixture can contain a monomer having a polymerizable double bond formed by two carbon atoms to which a hydrogen atom is bonded, in addition to the monomer having a polymerizable double bond formed by a carbon atom to which no hydrogen atom is bonded and a carbon atom to which a hydrogen atom is bonded.

The aforementioned polymerizable double bond formed by two carbon atoms to which a hydrogen atom is bonded is a structure represented by a styryl group and acrylate group. Just as above, a description using ethylene as an example follows. In this example structure, hydrogen atoms bonded to two carbon atoms that are constituents of ethylene are left as they are, or, one hydrogen atom from one or both carbon atoms is replaced by a carbon atom. A double bond having such a structure would not go through polymerization and depolymerization simultaneously even at high temperatures.

Examples of the aforementioned monomer having a polymerizable double bond formed by two carbon atoms to which a hydrogen atom is bonded include an acrylate monomer, polymerizable aromatic compounds, carboxylic acid compounds having a double bond, α-olefin compounds, and vinyl compounds. Of these, an acrylate monomer and polymerizable aromatic compounds are preferable because of their copolymerizability and also because they are easy to handle.

Specific examples of the acrylate monomer include methyl acrylate, ethyl acrylate, n-propyl acrylate, i-propyl acrylate, n-butyl acrylate, isobutyl acrylate, t-butyl acrylate, 2-ethylhexyl acrylate, lauryl acrylate, phenyl acrylate, isobornyl acrylate, cyclohexyl acrylate, t-butylcyclohexyl acrylate, dicyclopentadienyl acrylate, dihydrodicyclopentadienyl acrylate, hydroxyethyl acrylate, hydroxypropyl acrylate, hydroxybutyl acrylate, glycidyl acrylate, adduct of hydroxyethyl acrylate and ε caprolactone, acrylic acid, acrylic acid dimer, 2-acryloyloxyethyl phthalic acid, 2-acryloyloxyethyl succinic acid, ω-carboxy polycaprolactone monoacrylate, acrylonitrile, acrylamide, N-methylol acrylamide, N-butoxymethyl acrylamide, N,N-dimethyl acrylamide, N,N-dibutyl acrylamide, N,N-dioctyl acrylamide, N-monobutyl acrylamide, N-monooctyl acrylamide, N-(2-hydroxyethyl) acrylamide, 2-acrylamide-2-methylpropanesufonic acid, and 2-acryloyloxyethyl acid phosphate.

Examples of the aforementioned polymerizable aromatic compounds include styrene, vinyl ketone, t-butyl styrene, p-chlorostyrene, vinyl naphthalene, and 2,4-dihydroxy-4'-vinyl benzophenone. Furthermore, examples of the carboxylic acid compounds having a double bond include crotonic acid, isocrotonic acid, maleic acid, maleic acid anhydride, and fumaric acid. Also, examples of the α-olefin compounds include ethylene and propylene. And examples of the vinyl compounds include vinyl acetate, vinyl propionate, 3-vinyl salicylic acid, 3-vinylacetyl salicylic acid, allyl alcohol, butadiene, and isoprene. Two or more of these can be used as well.

The polymerization temperature of the method of preparing an acrylic copolymer of the present invention is 150° C. or higher, preferably 160–200° C. It is preferable to use a reactor vessel that can seal the reaction system.

When carrying out the aforementioned polymerization at 150–200° C., an initiator such as di(t-amyl)peroxide, di(t-butyl)peroxide, t-amylperoxy acetate, t-butylperoxy benzoate, and t-amylperoxy benzoate can be used. The amount to be used is, for example, 0.5–10 wt % of the aforementioned monomer mixture. When using a chain transfer agent such as α-methyl styrene dimer and mercaptan such as lauryl mercaptan, 5–10 wt % of the aforementioned monomer mixture can be used in terms of the amount.

For the organic solvent used in the polymerization, various types can be used such as hydrocarbon types, ester types, ketone types, alcohol types, and ether types. Considering the polymerization temperature, solvents having a boiling point of 100° C. or higher are preferable. Two or more of these solvents can be used in combination as well. The amount of the aforementioned solvent can be chosen as appropriate. For preparing a binder to be contained in a high solid type coating, 25–65 wt % of the amount of the monomer mixture is preferable.

For the aforementioned polymerization reaction, procedures of conventionally well-known acrylic polymerization methods can be used without modification. For example, a method is used in which the aforementioned monomer mixture and the initiator are dropped into the solvent heated up to the prescribed polymerization temperature. After completion of the dropping, maturing takes place while the polymerization temperature is maintained. In most cases this polymerization reaction is carried out over 2–9 hours.

In the method of preparing an acrylic copolymer of the present invention, additional heating at 80–130° C. is carried out after the aforementioned polymerization reaction. If the aforementioned heating temperature is outside of the aforementioned range, then it is difficult to reduce the amount of the unreacted monomer. The aforementioned heating time is not limited in particular. Usually 30 minutes to three hours is preferable.

Usually it is preferable to add an initiator during the aforementioned heating time. This is done to polymerize the remaining monomers, since common acrylic polymerization does not leave the initiator in the system after the aforementioned maturation. However, the initiator may not be necessary at this stage if the mixture is designed to leave some initiator even after the aforementioned maturation.

Since the aforementioned heating temperature is lower than the previous polymerization temperature, it is preferable to choose the initiator used at the time of the aforementioned heating accordingly. Preferable examples of such initiators include azobisisobutyronitrile, 2,3'-azobis(2-methylbutyronitrile), 2,2'-azobis(2,4-dimethylvaleronitrile), benzoyl peroxide, lauroyl peroxide, t-amyl peroxy-2-ethyl hexanoate, and t-butyl peroxy-2-ethyl hexanoate. The amount of the initiator used at the time of the aforementioned heating is not limited in particular. Usually 0.1–3 wt % of the amount of the aforementioned monomer mixture can be used.

At the time of the aforementioned heating after the polymerization reaction, a second monomer mixture consisting of a monomer having a polymerizable double bond formed by two carbon atoms to which a hydrogen atom is bonded can be added. The aforementioned second monomer mixture also includes those consisting of only one type of monomer. By adding a highly polymerizable monomer, a copolymer with the remaining monomer is expected to be formed easily. Because of this, an acrylate monomer and/or polymerizable aromatic compound is preferable for the monomer having a polymerizable double bond formed by two carbon atoms to which a hydrogen atom is bonded. For the aforementioned acrylate monomer to be added, non-bulky monomers having six or less carbon atoms in the ester portion of the acrylic ester are preferable. From the same perspective, the aforementioned polymerizable aromatic compound to be added is preferably styrene. The amount of the aforementioned second monomer mixture can be, for example, 0.1–3 wt % of the amount of the aforementioned monomer mixture.

Also, when these monomers are part of the monomers that are constituents of the aforementioned monomer mixture used as the raw material, i.e. if the aforementioned monomer mixture contains a monomer having a polymerizable double bond formed by two carbon atoms to which a hydrogen atom is bonded, these monomers are likely to have been polymerized sooner than the monomer having a polymerizable double bond formed by a carbon atom to which no hydrogen atom is bonded and a carbon atom to which a hydrogen atom is bonded. Therefore, when a copolymer with a composition as close as possible to the ratios of the monomers that are constituents of the aforementioned monomer mixture is desired, it is preferable to set aside 0.1–3 wt % of the monomer ingredient having a polymerizable double bond formed by two carbon atoms to which a hydrogen atom is bonded that is contained in the aforementioned monomer mixture and use this as the aforementioned second monomer mixture.

The acrylic copolymer thus obtained usually has a nonvolatile content of 60–80 wt %, weight average molecular weight of 3,000–6,000, and number average molecular weight of 1,500–3,000, as determined by means of gel permeation chromatography. The amount of the residual monomer contained in this is preferably 0.5 wt % or less. The aforementioned amount of the residual monomer can be determined by using analytical instruments such as high performance liquid chromatography (HPLC).

Since the method of preparing an acrylic copolymer of the present invention carries out the polymerization at a polymerization temperature of 150° C. or higher followed by further heating at 80–130° C., an acrylic copolymer containing a lesser amount of unreacted monomers can be obtained. Also, by adding styrene and/or an acrylate monomer, which have high reactivity, at the time of aforementioned heating, a copolymer having a composition as close as possible to the ratios of the monomers that are constituents of the raw material monomer mixture can be provided.

According to the method of preparing an acrylic copolymer of the present invention, an acrylic copolymer having a relatively small molecular weight used as a binder ingredient in a high solid type coating can be obtained without requiring a process of removing the organic solvent by means of distillation or an increase in the amount of the chain transfer agent.

EXAMPLES

Example 1

23.7 parts of butyl acetate was loaded into a pressure tight vessel equipped with a stirrer, a thermometer, a reflux condenser, and a dripping pump. In a nitrogen atmosphere the temperature was raised to 100° C. while stirring was maintained. At 100° C., the reactor vessel was sealed and the temperature was raised to 170° C. 100 parts of a monomer mixture consisting of 25 parts of styrene, 48 parts of glycidyl methacrylate, 24.5 parts of i-butyl methacrylate, and 2.5 parts of methyl methacrylate and 5.5 parts of an initiator solution prepared by dissolving 2.4 parts of di(t-amyl) peroxide in 3.1 parts of butyl acetate were dripped in using a dropping pump for three hours. After completion of the dropping, maturation took place for 30 minutes at 170° C., followed by lowering of the temperature down to 120° C. As the temperature was maintained at 120° C., an initiator solution prepared by dissolving 0.24 parts of Lupasol 575 (t-amylperoxy-2-ethylhexanoate from Atofina Yoshitomi, Ltd.) in 1 part of butyl acetate was dropped in at a constant rate over 30 minutes. After completion of the dropping, heating continued for one hour at 120° C. to obtain an acrylic copolymer solution which was a homogeneous transparent solution having a nonvolatile content of 75% and a viscosity of Z4"–Z5 according to a Gardner bubble viscometer. Also, the weight average molecular weight was 3,120 and the number average molecular weight was 1,640 as measured with GPC.

Example 2

An acrylic copolymer solution was obtained in the same manner as in Example 1 except for the fact that styrene in the monomer mixture was reduced by 1 part down to 24 parts, and this 1 part was dropped together with the initiator solution at the time of heating after the polymerization reaction. This copolymer solution was a homogeneous transparent solution having a nonvolatile content of 75% and a viscosity of Z4"–Z5 according to a Gardner bubble viscometer. Also, the weight average molecular weight was 3,100 and the number average molecular weight was 1,680 as measured with GPC.

Comparative Example

The same operation as Example 1 was carried out to the point when the monomer mixture and the initiator solution were dropped in. After completion of the dropping, maturation took place for 30 minutes at 170° C. And then an initiator solution prepared by dissolving 0.24 parts of di(t-amyl)peroxide in 1 part of butyl acetate was dropped in at a constant rate over 30 minutes. After completion of the dropping, heating continued for one hour at 170° C. to obtain an acrylic copolymer solution which was a homogeneous transparent solution having a nonvolatile content of 75% and a viscosity of Z4"–Z5 according to a Gardner bubble viscometer. Also, the weight average molecular weight was 3,050 and the number average molecular weight was 1,600 as measured with GPC.

Measuring the Amount of the Monomer

Approximately 100 mg of the obtained acrylic copolymer solution was put into a 10 mL measuring flask, diluted by addition of 1 mL of THF, and further diluted by addition of approximately 5 mL of methanol. To this, 1 mL of distilled water was added to precipitate resin ingredients and methanol was then added to make it 10 mL. After centrifugal sedimentation the supernatant fluid was analyzed with HPLC using water/acetonitrile for the eluate to determine the amount of the monomer in the copolymer solution. The results are shown in Table 1.

TABLE 1

| | | Example 1 | Example 2 | Comparative example |
|---|---|---|---|---|
| Monomer | Styrene | 0.00 | 0.01 | 0.00 |
| | Glycidyl methacrylate | 0.21 | 0.12 | 2.50 |
| | i-butyl methacrylate | 0.13 | 0.08 | 2.10 |
| | Methyl methacrylate | 0.02 | 0.00 | 0.18 |
| Total amount of the monomer | | 0.36 | 0.21 | 4.78 |

Unit ppm

In Examples 1 and 2 heating is done at 120° C. after the polymerization at 170° C. The total amount of the monomer in the copolymer solution was successfully reduced compared with Comparative example where the temperature was kept at 170° C. continuously throughout the polymerization and heating. Also, Example 2, in which styrene was added at the time of heating, reduced the total amount of the monomer in the copolymer solution even further than in Example 1.

What is claimed is:

1. A method of preparing an acrylic copolymer using as a raw material a monomer mixture comprising 50 mole% or more of a monomer having a polymerizable double bond formed by a carbon atom to which no hydrogen atom is bonded and a carbon atom to which a hydrogen atom is bonded, according to the following two steps, wherein:
   first polymerization is carried out at a polymerization temperature of 150° C. or higher, and
   second the temperature is then reduced and maintained at 80–130° C. until the amount of residual monomer in resultant polymerizate is reduced to 0.5 wt % or less.

2. The method of preparing the acrylic copolymer according to claim 1, wherein said monomer having a polymerizable double bond formed by a carbon atom to which no hydrogen atom is bonded and a carbon atom to which a hydrogen atom is bonded is a methacrylate monomer.

3. The method of preparing the acrylic copolymer according to claim 1, wherein said monomer having a polymerizable double bond is α-methylstyrene, itaconic acid, itaconic acid anhydride, citraconic acid, or citraconic acid anhydride.

4. The method of preparing the acrylic copolymer according to claim 2, wherein said monomer having a polymerizable double bond is α-methylstyrene, itaconic acid, itaconic acid anhydride, citraconic acid, or citraconic acid anhydride.

5. The method of preparing an acrylic copolymer according to claim 1, wherein an initiator is added to resultant polymerizate after the first polymerization reaction and during the second step.

6. The method of preparing an acrylic copolymer according to claim 2, wherein an initiator is added to resultant polymerizate after the first polymerization reaction and during the second step.

7. The method of preparing an acrylic copolymer according to claim 3, wherein an initiator is added to resultant polymerizate after the first polymerization reaction and during the second step.

8. The method of preparing an acrylic copolymer according to claim 4, wherein an initiator is added to resultant polymerizate after the first polymerization reaction and during the second step.

9. The method of preparing the acrylic copolymer according to claim 1, wherein a second monomer mixture comprising a monomer having a polymerizable double bond formed by two carbon atoms to which a hydrogen atom is bonded is added to resultant polymerizate after the first polymerization reaction and during the second step.

10. The method of preparing the acrylic copolymer according to claim 2, wherein a second monomer mixture comprising a monomer having a polymerizable double bond formed by two carbon atoms to which a hydrogen atom is bonded is added to resultant polymerizate after the polymerization reaction and during the second step.

11. The method of preparing the acrylic copolymer according to claim 3, wherein a second monomer mixture comprising a monomer having a polymerizable double bond formed by two carbon atoms to which a hydrogen atom is bonded is added to resultant polymerizate after the polymerization reaction and during the second step.

12. The method of preparing the acrylic eopolymer according to claim 4, wherein a second monomer mixture comprising a monomer having a polymerizable double bond formed by two carbon atoms to which a hydrogen atom is bonded is added to resultant polymerizate after the polymerization reaction and during the second step.

13. The method of preparing the acrylic copolymer according to claim 5, wherein a second monomer mixture comprising a monomer having a polymerizable double bond formed by two carbon atoms to which a hydrogen atom is bonded is added to resultant polymerizate after the polymerization reaction and during the second step.

14. The method of preparing the acrylic copolymer according to claim 6, wherein a second monomer mixture comprising a monomer having a polymerizable double bond formed by two carbon atoms to which a hydrogen atom is bonded is added to resultant polymerizate after the polymerization reaction and during the second step.

15. The method of preparing the acrylic copolymer according to claim 7, wherein a second monomer mixture comprising a monomer having a polymerizable double bond formed by two carbon atoms to which a hydrogen atom is bonded is added to result polymerizate after the polymerization reaction and during the second steps.

16. The method of preparing the acrylic copolymer according to claim 8, wherein a second monomer mixture comprising a monomer having a polymerizable double bond formed by two carbon atoms to which a hydrogen atom is bonded is added to resultant polymerizate after the polymerization reaction and during the second step.

17. The method of preparing the acrylic copolymer according to claim 9, wherein said monomer having a polymerizable double bond formed by two carbon atoms to which a hydrogen atom is bonded is a polymerizable aromatic compound and/or acrylate monomer.

18. The method of preparing the acrylic copolymer according to claim 10, wherein said monomer having a polymerizable double bond formed by two carbon atoms to which a hydrogen atom is bonded is a polymerizable aromatic compound and/or acrylate monomer.

19. The method of preparing the acrylic copolymer according to claim 11, wherein said monomer having a polymerizable double bond formed by two carbon atoms to which a hydrogen atom is bonded is a polymerizable aromatic compound and/or acrylate monomer.

20. The method of preparing the acrylic copolymer according to claim 12, wherein said monomer having a polymerizable double bond formed by two carbon atoms to which a hydrogen atom is bonded is a polymerizable aromatic compound and/or acrylate monomer.

21. The method of preparing the acrylic copolymer according to claim 13, wherein said monomer having a polymerizable double bond formed by two carbon atoms to which a hydrogen atom is bonded is a polymerizable aromatic compound and/or acrylate monomer.

22. The method of preparing the acrylic copolymer according to claim 14, wherein said monomer having a polymerizable double bond formed by two carbon atoms to which a hydrogen atom is bonded is a polymerizable aromatic compound and/or acrylate monomer.

23. The method of preparing the acrylic copolymer according to claim 15, wherein said monomer having a polymerizable double bond formed by two carbon atoms to which a hydrogen atom is bonded is a polymerizable aromatic compound and/or acrylate monomer.

24. The method of preparing the acrylic copolymer according to claim 16, wherein said monomer having a polymerizable double bond formed by two carbon atoms to which a hydrogen atom is bonded is a polymerizable aromatic compound and/or acrylate monomer.

25. The method of preparing the acrylic copolymer according to claim 9, wherein said monomer having a polymerizable double bond formed by two carbon atoms to which a hydrogen atom is bonded is contained in a monomer that is a constituent of said monomer mixture.

26. The method of preparing the acrylic copolymer according to claim 10, wherein said monomer having a polymerizable double bond formed by two carbon atoms to which a hydrogen atom is bonded is contained in a monomer that is a constituent of said monomer mixture.

27. The method of preparing the acrylic copolymer according to claim 11, wherein said monomer having a polymerizable double bond formed by two carbon atoms to which a hydrogen atom is bonded is contained in a monomer that is a constituent of said monomer mixture.

28. The method of preparing the acrylic copolymer according to claim 12, wherein said monomer having a polymerizable double bond formed by two carbon atoms to which a hydrogen atom is bonded is contained in a monomer that is a constituent of said monomer mixture.

29. The method of preparing the acrylic copolymer according to claim 13, wherein said monomer having a polymerizable double bond formed by two carbon atoms to which a hydrogen atom is bonded is contained in a monomer that is a constituent of said monomer mixture.

30. The method of preparing the acrylic copolymer according to claim 14, wherein said monomer having a polymerizable double bond formed by two carbon atoms to which a hydrogen atom is bonded is contained in a monomer that is a constituent of said monomer mixture.

31. The method of preparing the acrylic copolymer according to claim 15, wherein said monomer having a polymerizable double bond formed by two carbon atoms to which a hydrogen atom is bonded is contained in a monomer that is a constituent of said monomer mixture.

32. The method of preparing the acrylic copolymer according to claim 16, wherein said monomer having a polymerizable double bond formed by two carbon atoms to which a hydrogen atom is bonded is contained in a monomer that is a constituent of said monomer mixture.

33. The method of preparing the acrylic copolymer according to claim 17, wherein said monomer having a polymerizable double bond formed by two carbon atoms to which a hydrogen atom is bonded is contained in a monomer that is a constituent of said monomer mixture.

34. The method of preparing the acrylic copolymer according to claim 18, wherein said monomer having a polymerizable double bond formed by two carbon atoms to which a hydrogen atom is bonded is contained in a monomer that is a constituent of said monomer mixture.

35. The method of preparing the acrylic copolymer according to claim 19, wherein said monomer having a polymerizable double bond formed by two carbon atoms to which a hydrogen atom is bonded is contained in a monomer that is a constituent of said monomer mixture.

36. The method of preparing the acrylic copolymer according to claim 20, wherein said monomer having a polymerizable double bond formed by two carbon atoms to which a hydrogen atom is bonded is contained in a monomer that is a constituent of said monomer mixture.

37. The method of preparing the acrylic copolymer according to claim 21, wherein said monomer having a polymerizable double bond formed by two carbon atoms to which a hydrogen atom is bonded is contained in a monomer that is a constituent of said monomer mixture.

38. The method of preparing the acrylic copolymer according to claim 22, wherein said monomer having a polymerizable double bond formed by two carbon atoms to which a hydrogen atom is bonded is contained in a monomer that is a constituent of said monomer mixture.

39. The method of preparing the acrylic copolymer according to claim 23, wherein said monomer having a polymerizable double bond formed by two carbon atoms to which a hydrogen atom is bonded is contained in a monomer that is a constituent of said monomer mixture.

40. The method of preparing the acrylic copolymer according to claim 24, wherein said monomer having a polymerizable double bond formed by two carbon atoms to which a hydrogen atom is bonded is contained in a monomer that is a constituent of said monomer mixture.

* * * * *